(12) United States Patent
Chang et al.

(10) Patent No.: US 7,697,548 B2
(45) Date of Patent: Apr. 13, 2010

(54) LOAD BALANCING OF BROADBAND SUBSCRIBER SESSIONS

(75) Inventors: Johnny Albert Chang, Cary, NC (US); Matthew Wayne Lambert, Holly Springs, NC (US)

(73) Assignee: Cisco Technology, Inc., San Jose, CA (US)

( * ) Notice: Subject to any disclaimer, the term of this patent is extended or adjusted under 35 U.S.C. 154(b) by 425 days.

(21) Appl. No.: 11/672,469

(22) Filed: Feb. 7, 2007

(65) Prior Publication Data

US 2008/0186982 A1 Aug. 7, 2008

(51) Int. Cl.
*H04L 12/28* (2006.01)
(52) U.S. Cl. ............... 370/400; 370/411; 709/226
(58) Field of Classification Search ............ None
See application file for complete search history.

(56) References Cited

U.S. PATENT DOCUMENTS

| | | | |
|---|---|---|---|
| 6,862,618 B1 * | 3/2005 | Gray et al. ............ 709/224 |
| 6,917,592 B1 * | 7/2005 | Ramankutty et al. ........ 370/237 |
| 7,099,305 B1 | 8/2006 | Fardid | |
| 7,487,243 B1 * | 2/2009 | Zielinski et al. ............ 709/226 |
| 2003/0039244 A1 | 2/2003 | Owens | |
| 2004/0230683 A1 * | 11/2004 | Adamczyk et al. ......... 709/227 |
| 2004/0264443 A1 | 12/2004 | Beck | |
| 2006/0062211 A1 | 3/2006 | Manthoulis | |
| 2006/0203773 A1 | 9/2006 | Georges | |
| 2006/0251063 A1 | 11/2006 | Bordonaro | |

* cited by examiner

*Primary Examiner*—Jayanti K Patel
*Assistant Examiner*—Jung Park
(74) *Attorney, Agent, or Firm*—Stolowitz Ford Cowger LLP

(57) ABSTRACT

We describe an example system that includes a plurality of aggregation nodes. Each aggregation node is configured to generate a node utilization data. A pool master is configured to generate a node utilization list responsive to the node utilization data received from each aggregation node and to activate the plurality of aggregation nodes responsive to the node utilization list.

11 Claims, 9 Drawing Sheets

LOAD BALANCING OF BROADBAND SUBSCRIBER SESSIONS

TECHNICAL FIELD

The present relates generally to load balancing of broadband subscriber sessions.

BACKGROUND

An aggregation node, e.g., a broadband remote access server (BRAS), routes traffic to and from a subscriber on an Internet service provider's (ISP's) network. The aggregation node sits at the core of an ISP's network, aggregates user sessions from the access network, and routes traffic into the ISP's backbone network. An ISP may also inject policy management and Quality of Service (QoS) in the network through the aggregation nodes.

A network may include a plurality of aggregation nodes. A subscriber may connect to the network and the plurality of aggregation nodes through a digital subscriber line access multiplexer (DSLAM). In a broadband aggregation network, a subscriber usually connects to a single aggregation node that may, in turn, connect to other such subscribers. Each of the subscribers connected to the single aggregation node may require different bandwidth or load. The aggregation node, therefore, must be adequately sized to support the highest subscriber bandwidth or load requirement resulting in misuse of aggregation node resources. And the single aggregation node catering to a plurality of subscribers may not scale well and provide a single failure point. No mechanism currently exists to balance subscriber loads across a single or multiple aggregation nodes in a fair and balanced manner. The standard mechanisms used for aggregation, e.g., point-to-point protocol (PPP) and dynamic host configuration protocol (DHCP), rely on a first-response from the aggregation node and have no inherent load balancing capabilities.

DESCRIPTION OF EXAMPLE EMBODIMENTS

Overview

Figure 1:
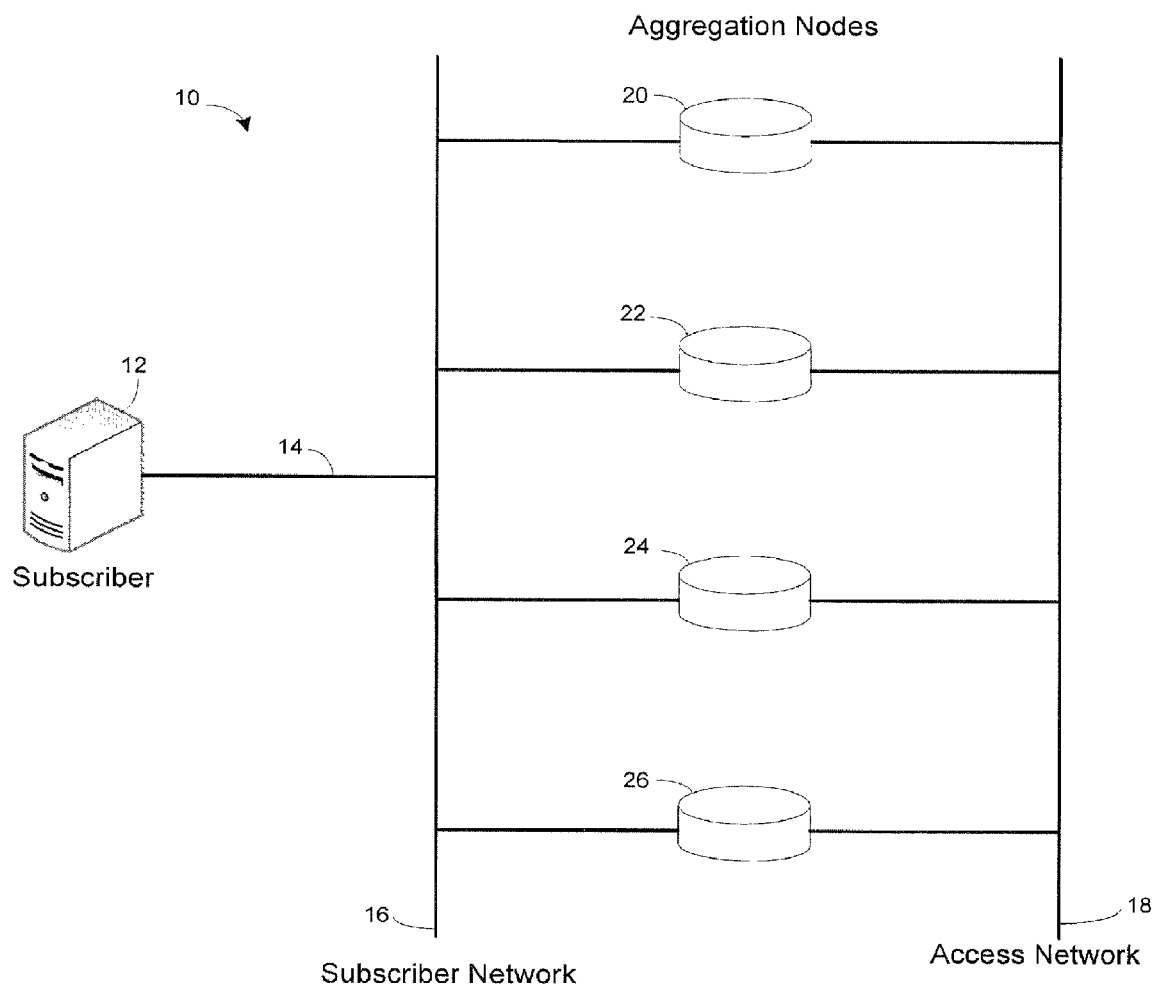
FIG. 1 illustrates an example network including a plurality of aggregation nodes.

We describe an example method that comprises generating node utilization data for each of a plurality of aggregation nodes, generating a node utilization list responsive to the node utilization data and activating an aggregation node from the plurality of aggregation nodes responsive to the node utilization list.

We describe an example system that comprises a plurality of aggregation nodes, each aggregation node configured to generate a node utilization data, a pool master configured to generate a node utilization list responsive to the node utilization data received from each aggregation node and to activate the plurality of aggregation nodes responsive to the node utilization list.

And we describe an example network that comprises a plurality of aggregation nodes each configured to generate corresponding node utilization data, and a pool master configured to, responsive to the corresponding node utilization data, balance a load of each of the plurality of aggregation nodes.

Description

We describe examples of automated load balancing of broadband subscriber sessions with reference to the accompanying drawings. Various other examples are possible and practical and are not limited to the examples we describe below.

In the figures, the size of the boxes does not represent size of the various physical components. Where the same element appears in multiple figures, we use the same reference numeral to denote the element in all of the figures where it appears. When two elements operate differently, we use different reference numerals regardless of whether the two elements are the same class of network device.

FIG. 1 illustrates an example network including a plurality of aggregation nodes. Referring to FIG. 1, a network 10, e.g., a broadband network may include a broadband subscriber 12 and a plurality of aggregation nodes 20, 22, 24, and 26. The subscriber 12 may be connected to a subscriber network 16. A plurality of other subscribers (not shown) may also be connected to the subscriber network 16. The subscriber 12 may be connected to the subscriber network 16 through a variety of switches, routers, multiplexers, and other like devices. In an embodiment, the subscriber 12 may be connected to the subscriber network 16 through a digital subscriber line access multiplexer (DSLAM).

Each of the plurality of aggregation nodes 20, 22, 24, and 26 is connected to the subscriber network 16. Each of the plurality of aggregation nodes 20, 22, 24, and 26 is also connected to an access network 18, through which the aggregation nodes 20, 22, 24, and 26 may access any external network, e.g., the Internet®. The aggregation nodes 20, 22, 24, and 26 may be configured to operate in parallel such that any one of the plurality of aggregation nodes may accept and maintain a broadband subscriber session with the subscriber 12 (or any other subscriber connected to the subscriber network 16).

Each of the plurality of aggregation nodes 20, 22, 24, and 26 may have two possible states of operation: active and inactive. When the subscriber 12 connected to the subscriber network 16 initiates a new subscriber session, it may transmit a request for a new subscriber session to the plurality of aggregation nodes 20, 22, 24, and 26. Any of the aggregation nodes 20, 22, 24, and 26 may respond to such a request and accept a new subscriber session with the subscriber 12 only if it is active. That is, only an active aggregation node may accept a new subscriber session. An inactive aggregation node may not accept any new subscriber sessions, although an inactive aggregation node may maintain subscriber sessions that the aggregation node had accepted while it was previously active. In the embodiment of FIG. 1, at any given time, one or more aggregation nodes 20, 22, 24, and 26 may be active and only the active aggregation nodes 20, 22, 24, and 26 may respond to a request for a new subscriber session from a subscriber 12 connected to the subscriber network 16. The aggregations nodes 20, 22, 24, and 26 may become active and inactive in a variety of well known manners, some of which we discuss below.

During a given interval of time, an active aggregation node may accept several new subscriber sessions. An aggregation node may also maintain several subscriber sessions that it had accepted earlier. At any given instant, the total number of subscriber sessions an aggregation node maintains is referred as the subscriber load (or load). Put differently, the load is a total number of subscribers connected to the aggregation node at that time. The maximum number of subscriber sessions that an aggregation node may maintain is termed the capacity of the aggregation node. The subscriber load of an aggregation node may also be expressed as the ratio of the number of subscribers connected to the aggregation node and the maximum number of subscriber sessions that the aggregation node may maintain, in a scale of 0 to 100. We refer to this ratio as a node utilization data for the aggregation node. For example, if the aggregation node 20 is able to accept a maximum of 5000 subscriber sessions and the aggregation node 20 is currently maintaining 1000 subscriber sessions, then the current node utilization data for the aggregation node 20 is 1000/5000×100=20. More generally, the node utilization data of an aggregation node indicates the aggregation node's utilization, e.g., heavy or light.

Figure 2:
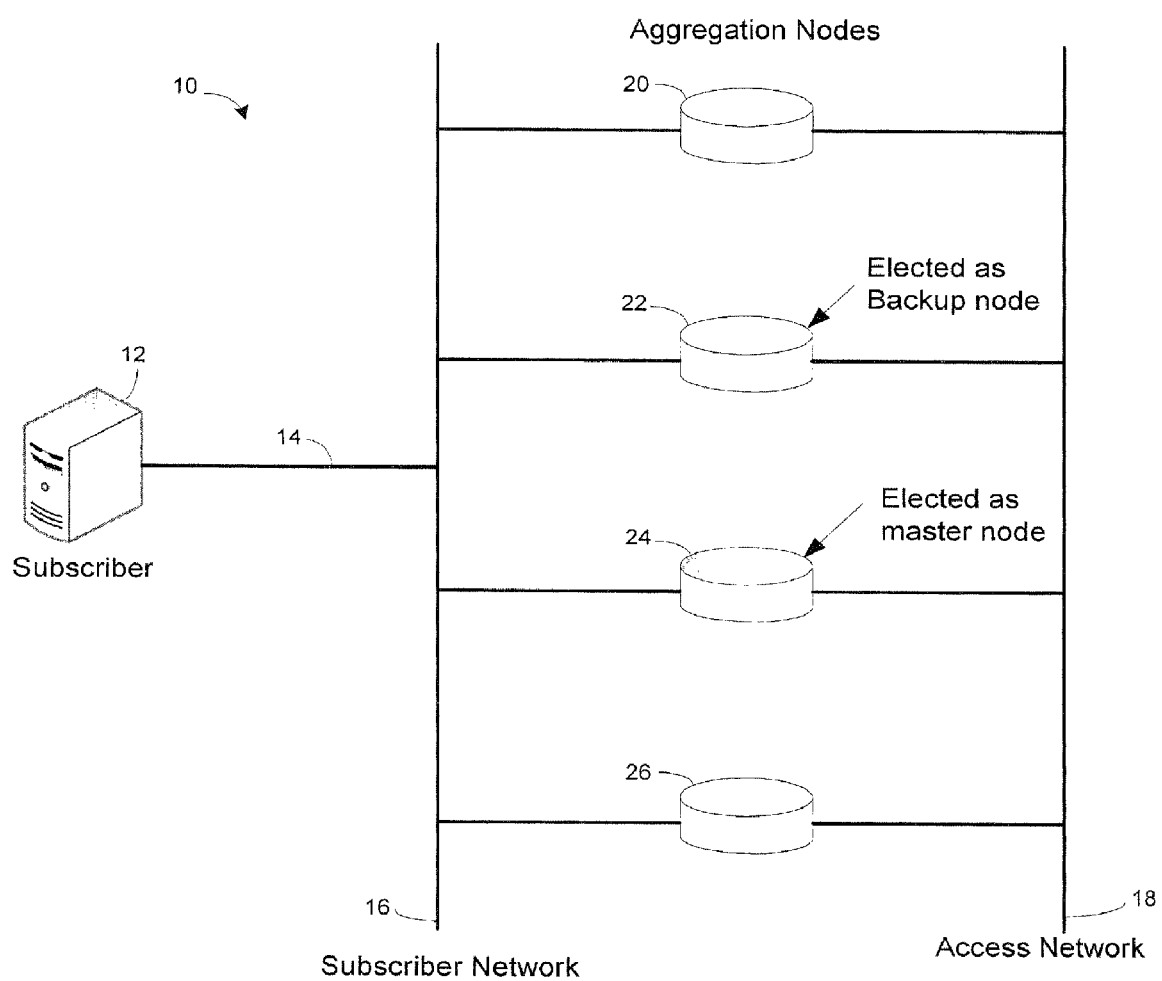
FIG. 2 illustrates an example network including a plurality of aggregation nodes, with one aggregation node selected as a master node.

FIG. 2 illustrates an example network including a plurality of aggregation nodes 20, 22, 24, and 26, with the aggregation node 24 selected as a master node and the aggregation node 22 elected as a backup node. A master node may be the first node to become active and start accepting new subscriber sessions. Also, in the case when an algorithm that controls the activation and deactivation of the aggregation nodes fails, the master node may become active. The master node may also become active when any such algorithm is initialized. A backup node, for its part, may act as a backup to the master node in circumstances where the master node fails or is otherwise unable to serve as the master node. In the example of FIG. 2, aggregation node 24 is elected as the master node and the aggregation node 22 is elected as the backup node. Henceforth, in all the figures, we indicate an active aggregation node by partially darkening the object representing the active node, as is the case with aggregation node 24 in FIG. 2. Accordingly, after becoming active, the aggregation node 24 starts accepting new subscriber sessions from subscribers 12 connected to the subscriber network 16.

The election of the master and the backup nodes 24 and 22, respectively, may occur based on several factors. For example, each aggregation node 20, 22, 24, and 26 may have a configurable priority associated with it and the aggregation node with the highest priority may be elected as the master node, with the second highest priority aggregation node elected as the backup node. In another arrangement, the aggregation nodes 20, 22, 24, and 26 may be categorized based on the maximum number of subscriber sessions they may maintain; the aggregation node with the highest subscriber session maintenance capacity may be elected the master node. Alternatively, the election of the master and backup nodes 24 and 22, respectively, may be arbitrary or based on any other appropriate factor.

Figure 3:
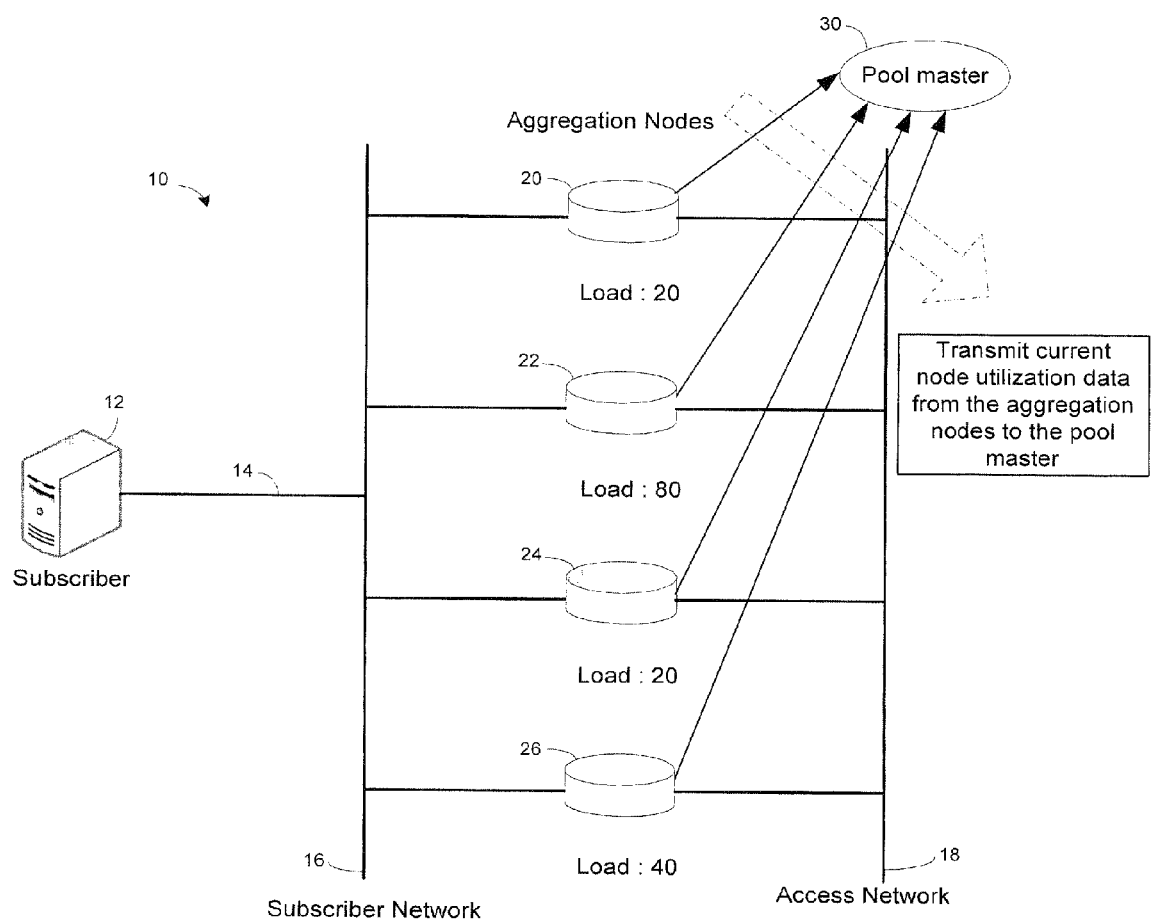
FIG. 3 illustrates the example network of FIG. 2, where the plurality of aggregation nodes transmits load information to a pool master.

FIG. 3 illustrates the example network of FIG. 2, where each of the plurality of aggregation nodes 20, 22, 24, and 26 transmits its respective node utilization data to a pool master 30. A pool master receives node utilization data from the aggregation nodes and generates a node utilization list responsive to the node utilization data, as explained in details later. The pool master 30 may reside in any one of the aggregation nodes 20, 22, 24, and 26, e.g., the master node 24. Any one of the aggregation nodes 20, 22, 24, and 26, e.g., the master node 24, may also act as the pool master 30. Alternatively, the pool master 30 may be separate and distinct from the aggregation nodes 20, 22, 24, and 26. The node utilization data of an aggregation node 20, 22, 24, or 26 may be the ratio of the number of subscribers 12 connected to the aggregation node to the maximum number of subscriber sessions that the aggregation node may maintain, in the scale of 0 to 100. In the example embodiment of FIG. 3, the node utilization data of aggregation nodes 20, 22, 24, and 26 are 20, 80, 20, and 40, respectively. The inventive principles we describe here, however, are not limited to the aggregation nodes 20, 22, 24, and 26 transmitting node utilization data to the pool master 30. Each aggregation node 20, 22, 24, and 26, for example, may only transmit the actual number of subscribers 12 connected to the aggregation node. The pool master 30 may already be aware of the maximum number of subscriber sessions each aggregation node 20, 22, 24, and 26 may maintain and thus, the pool master 30 may readily calculate the node utilization data of the aggregation nodes 20, 22, 24, and 26. Other possible arrangements are also possible. For example, some of the aggregation nodes e.g., nodes 20 and 22, may transmit their respective node utilization data while the rest of the aggregation nodes, e.g., nodes 24 and 26, may only transmit the actual number of subscribers 12 they are connected to, from which the pool master 30 may calculate the respective node utilization data.

Figure 4:
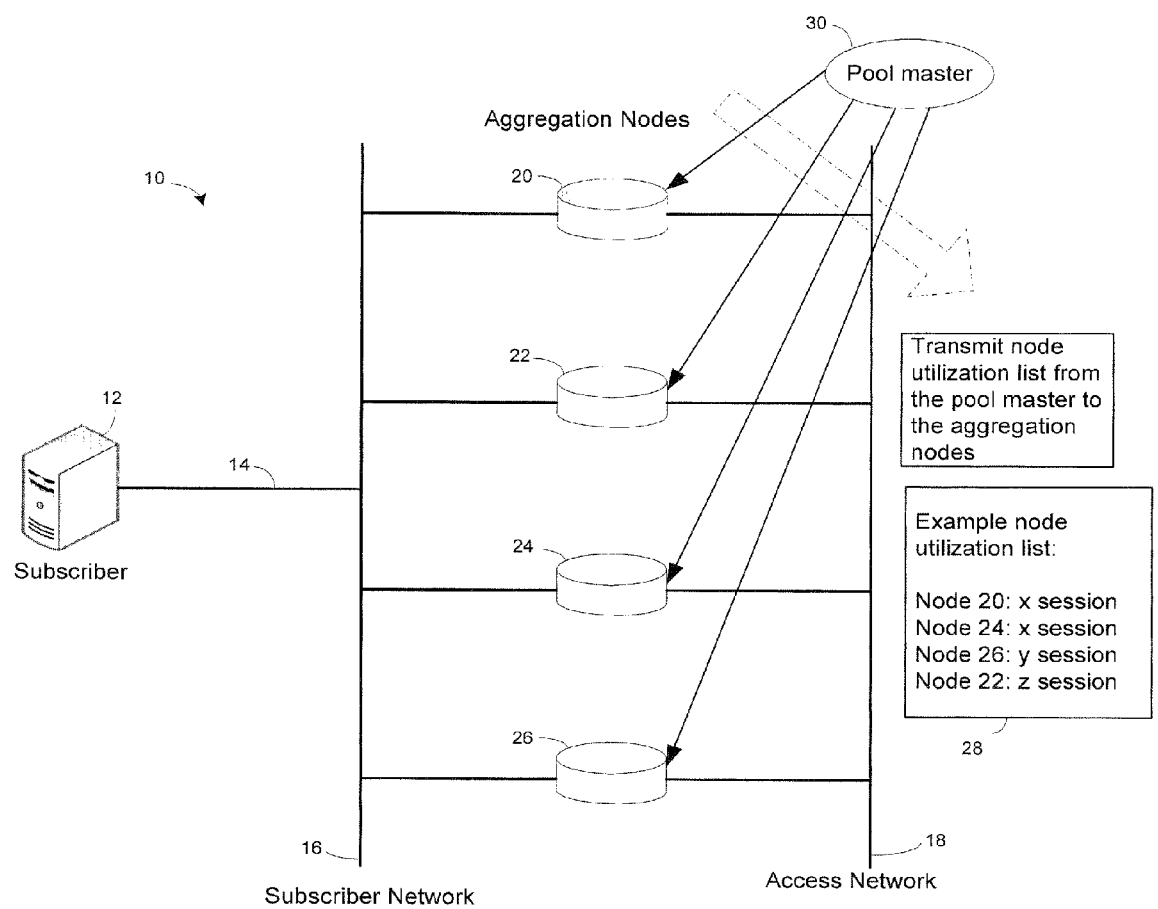
FIG. 4 illustrates an example network of FIG. 3, where the pool master transmits a node utilization list to the plurality of aggregation nodes.

Once the pool master 30 receives node utilization data from all the aggregation nodes 20, 22, 24, and 26, it may generate a node utilization list 28 responsive to the node utilization data. The pool master 30 then transmits the node utilization list 28 to all the aggregation nodes 20, 22, 24, and 26, as shown in FIG. 4. Referring to FIG. 4, the node utilization list 28 determines the schedule or sequence by which the individual aggregation nodes 20, 22, 24, and 26 activate and deactivate, as we discuss below. The pool master 30 may utilize any appropriate scheduling algorithm to generate the node utilization list 28; the present is not limited to any particular scheduling algorithm used by the pool master 30. For example, the pool master 30 may generate the node utilization list 28 using a weighted round robin scheduling. In its simplest form, the pool master 30 may categorize the aggregation nodes 20, 22, 24, and 26 based on the node utilization data and the node utilization list 28 may have the less or more lightly utilized aggregation nodes (e.g., with lower node utilization data) appear before the more heavily utilized aggregation nodes (e.g., with higher node utilization data).

In the example embodiment of FIG. 4, the pool master 30 generates a node utilization list 28 based on the node utilization data received from the aggregation nodes in FIG. 3. Referring back to FIG. 3, aggregation nodes 20 and 24 have the lowest node utilization data of 20. Aggregation node 26 has a node utilization data of 40 and aggregation node 22 has the highest node utilization data of 80. Put differently, aggregation nodes 20 and 24 are the least utilized aggregation nodes and aggregation node 26 is the most utilized node. Once the pool master receives the node utilization data (FIG. 3), it generates the node utilization list 28 and transmits the node utilization list 28 to the aggregation nodes 20, 22, 24, and 26.

In the case the node utilization data of two or more nodes are substantially equal, these nodes may be listed using a configurable priority of the aggregation nodes. That is, each of the aggregation nodes 20, 22, 24, and 26 may have a configurable priority assigned to it. Whenever more than one aggregation node have the same node utilization data, the aggregation node with higher priority may appear before the aggregation node with lower priority in the node utilization list 28. Alternatively, when the node utilization data of two or more aggregation nodes are substantially equal, the ordering of these nodes may be made randomly or by any other known means.

Referring to FIGS. 3 and 4, both aggregation nodes 20 and 24 have a node utilization data of 20. In the example node utilization list 28, these two aggregation nodes appear before any other aggregation nodes as these two aggregation nodes have the lowest node utilization data. As the node utilization data for these two aggregation nodes are same, the ordering of aggregation nodes 20 and 24 may be made based on an assigned configurable priority or any other known means, as we explain above. That is, if aggregation node 20 has a higher priority than node 24, then aggregation node 20 appears before aggregation node 24, as is the case in the example node utilization list 28. Alternatively, nodes 20 and 24 may be arranged using any other appropriate criteria or may simply be ordered randomly. Referring back to FIG. 3, aggregation node 26 has a node utilization data of 40 and aggregation node 22 has the highest node utilization data of 80. Accordingly, aggregation node 26 appears third and aggregation node 22 appears last in the node utilization list 28. Thus, the exemplary node utilization list 28 has nodes 20, 24, 26, and 22 appearing in that order. As would be seen later, the aggregation nodes may become active and inactive in the order the aggregation nodes appear in node utilization list.

Apart from the order by which the aggregation nodes may become active and inactive, the node utilization list 28 may also include information on how many new subscriber sessions an aggregation node may accept before it reaches a certain threshold value and becomes inactive. In an embodiment, this information may be expressed as a ratio of the actual number of new subscriber sessions the aggregation node may accept before it reaches the threshold value and the maximum number of subscriber sessions that the aggregation node may maintain, in a scale of 0 to 100. The threshold value may be less than or equal to the maximum number of subscriber sessions that the aggregation may maintain. For example, referring back to FIG. 3, the aggregation node 20 has a node utilization data of 20. Assume that the aggregation node may maintain maximum N number of subscriber sessions and the threshold value is 0.95N. A node utilization data of 20 would then imply that the aggregation node has 20N/100 number of subscribers connected to it and it may further accept (0.95N-20N/100)=75N/100 number of subscribers before it reaches the threshold value of 0.95N number of subscriber sessions (assuming none of the already connected subscribers terminate their sessions). When expressed as a ratio in a scale of 0 to 100, the aggregation node 20 may be able to accept 70 new sessions before it reaches the threshold value. The node utilization list 28 may include this information for all the aggregation nodes. For example, the node utilization list 28 includes the number of sessions (x, x, y, and z sessions) aggregation nodes 20, 24, 26, and 22 may respectively accept before the aggregation nodes reaches the threshold value. The threshold value for different aggregation nodes need not be the same and may be a user programmable parameter.

After the pool master 30 transmits the node utilization list 28 to the aggregation nodes 20, 22, 24, and 26, the first aggregation node 20 in the node utilization list 28 becomes active and starts accepting new subscriber sessions from the subscribers 12 connected to the subscriber network 16. Any previously active aggregation node becomes inactive. In the example network of FIG. 4, the aggregation node 20 is the first aggregation node in the node utilization list 28 and hence, the aggregation node 20 becomes active and starts accepting new subscriber sessions from subscribers 12 connected to the subscriber network 16.

Figure 5:
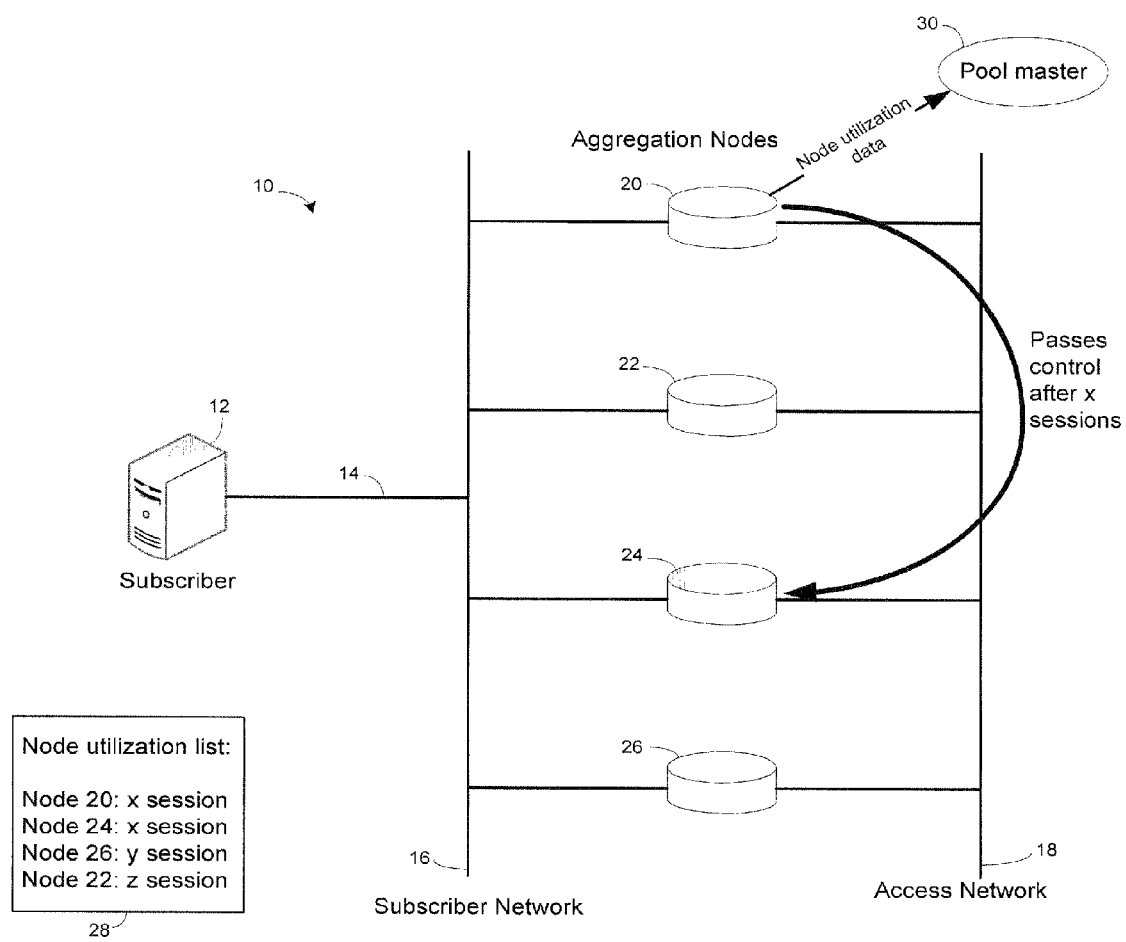
FIGS. 5-8 illustrate examples of a network of FIG. 3, where an aggregation node passes control to another aggregation node and transmits load information to a pool master.

After the first listed aggregation node (node 20) accepts the certain number of new subscriber sessions specified in the node utilization list 28, the second aggregation node (node 24) listed in the node utilization list 28 becomes active and starts accepting new subscriber sessions from subscribers 12 connected to the subscriber network 16. The first aggregation node (node 20) in the node utilization list 28 then becomes inactive, i.e., no longer accepts any new subscriber sessions, and generates and transmits its current node utilization data to the pool master 30. Referring to FIG. 4, the node utilization list 28 indicates that aggregation node 20 may accept x new subscriber sessions. After accepting x new subscriber sessions, the aggregation node 20 passes control to the second listed aggregation node (node 24) in the node utilization list 28 as illustrated in FIG. 5. That is, after the aggregation node 20 has accepted x new subscriber sessions, aggregation node 22 becomes active, after which aggregation node 20 becomes inactive, and generates and transmits its node utilization data to the pool master 30.

Figure 6:
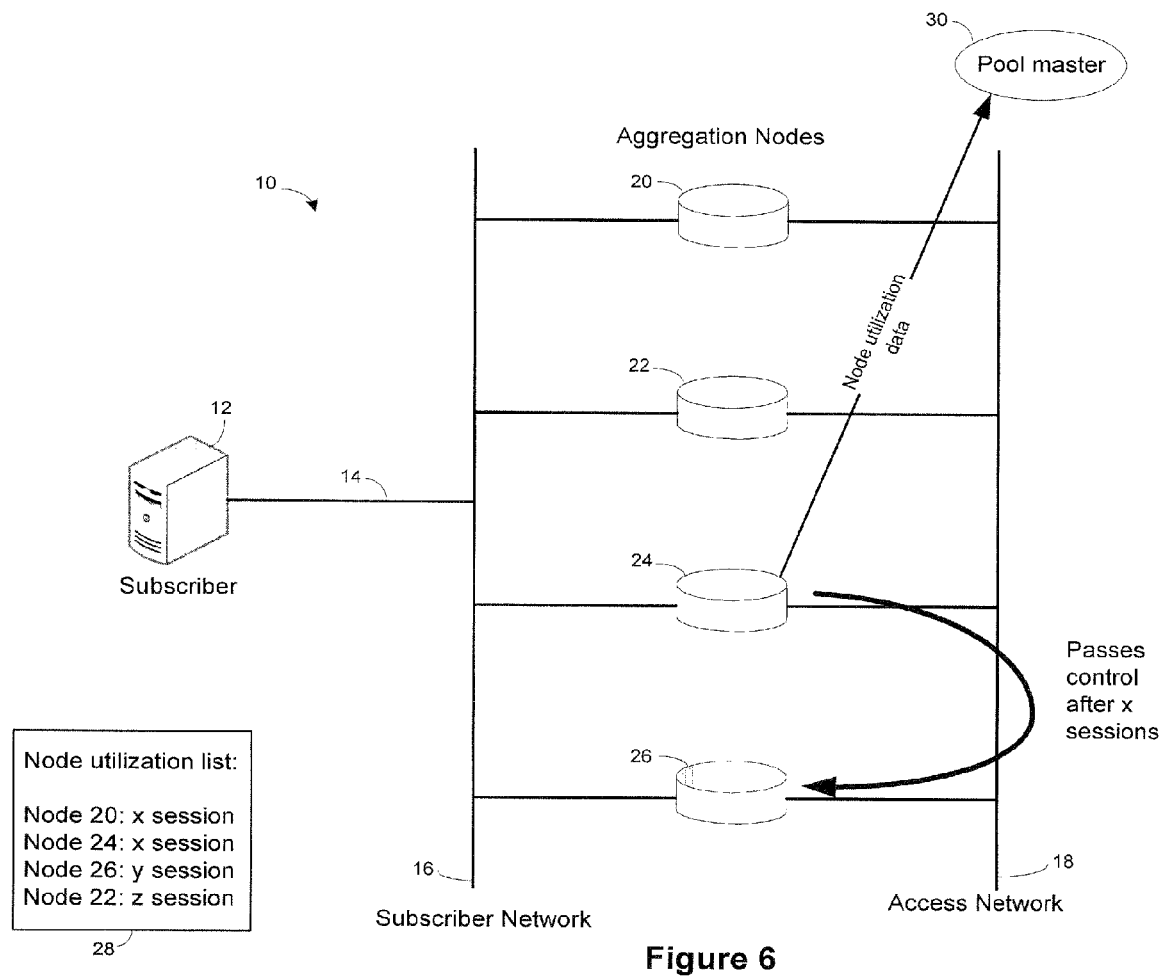

After the second listed aggregation node (node 24) accepts the specified number of subscriber sessions provided in the list 28, the third aggregation node (node 26) in the node utilization list 28 becomes active, after which the second listed aggregation node 24 becomes inactive and generates and transmits its node utilization data to the pool master 30. In the example network of FIG. 4, after aggregation node 24 has accepted x number of new sessions, it passes control to the third listed aggregation node (node 26) as illustrated in FIG. 6. That is, after aggregation node 24 has accepted x new subscriber sessions, aggregation node 26 becomes active, after which aggregation node 24 becomes inactive and generates and transmits its node utilization data to the pool master 30.

Figure 7:
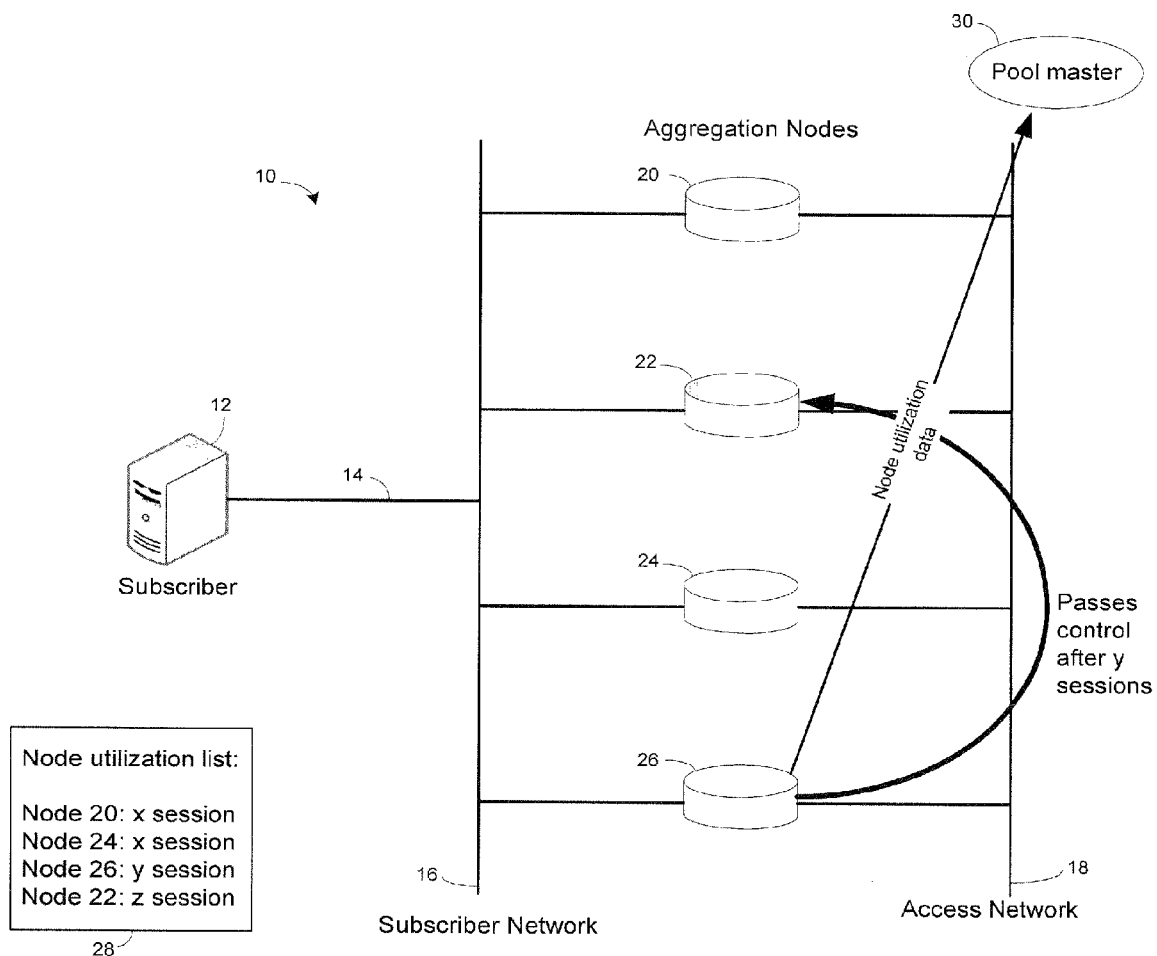

Referring to FIG. 7, the node utilization list 28 indicates that aggregation node 26 may accept y new subscriber sessions. After accepting y new subscriber sessions, aggregation node 26 passes control to the last listed aggregation node (node 22) in the node utilization list 28. That is, after aggregation node 26 has accepted y new subscriber sessions, aggregation node 22 becomes active, after which aggregation node 26 becomes inactive and generates and transmits its current node utilization data to the pool master 30.

The process continues until the last aggregation node in the node utilization list 28 becomes active. After the last listed aggregation node (node 22) accepts specified number of new subscriber sessions mentioned in the node utilization list 28, the first listed aggregation node (node 20) may become active once again. The last listed aggregation node then becomes inactive and generates and transmits its current node utilization data to the pool master 30.

Figure 8:
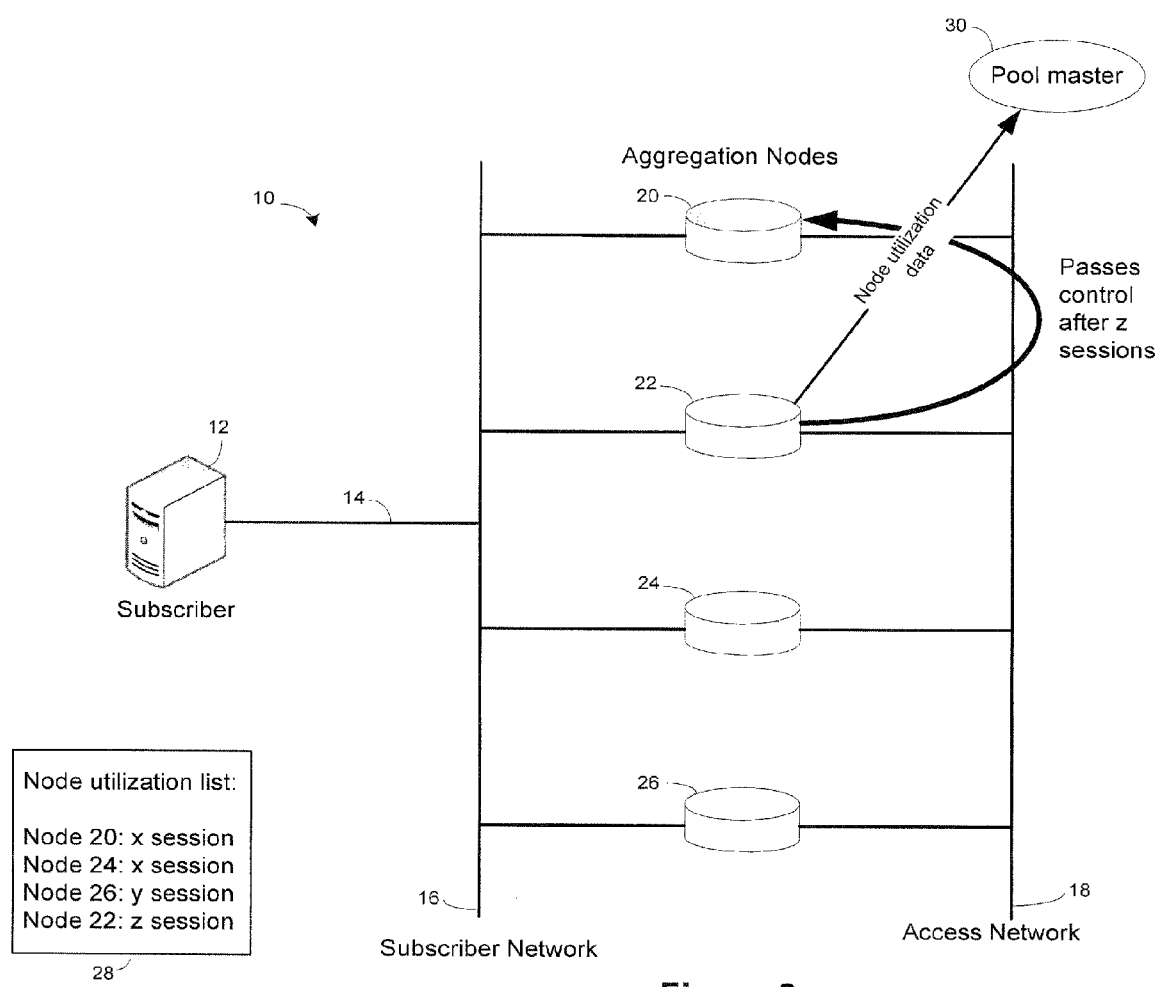

The pool master 30 generates a new node utilization list 28 responsive to the node utilization data received from the aggregation nodes 20, 22, 24, and 26. The pool master 30 transmits the new list 28 to the aggregation nodes 20, 22, 24, and 26. FIG. 8 illustrates that after accepting z new subscriber sessions, that last listed aggregation node 22 passes control to aggregation node 20, which is the first aggregation node in the node utilization list 20. That is, aggregation node 20 becomes active, after which aggregation node 22 becomes inactive, generates and transmits its current node utilization data to the pool master 30. The pool master then may generate a new node utilization list 28 responsive to the node utilization data received from the aggregation nodes 20, 22, 24, and 26. The pool master 30 may transmit the new node utilization list 28 to the aggregation nodes 20, 22, 24, and 26, as shown in FIG. 4. The aggregation nodes 20, 22, 24, and 26 may then become active and inactive responsive to the new node utilization list 28 and the process continues.

As each aggregation node 20, 22, 24, and 26 is active and accepts new subscriber sessions based on its node utilization data, this ensures the subscriber load connected to the subscriber network 16 is distributed substantially evenly among the aggregation nodes 20, 22, 24, and 26. The number of new connections that an aggregation node may accept while it is active is proportional to its node utilization data. That is, when an aggregation node is lightly loaded, it may accept a larger number of new subscriber sessions as compared to when it is heavily loaded. Thus, the load of subscribers 12 connected to the subscriber network 16 is substantially balanced across the plurality of aggregation nodes 20, 22, 24, and 26.

Figure 9:
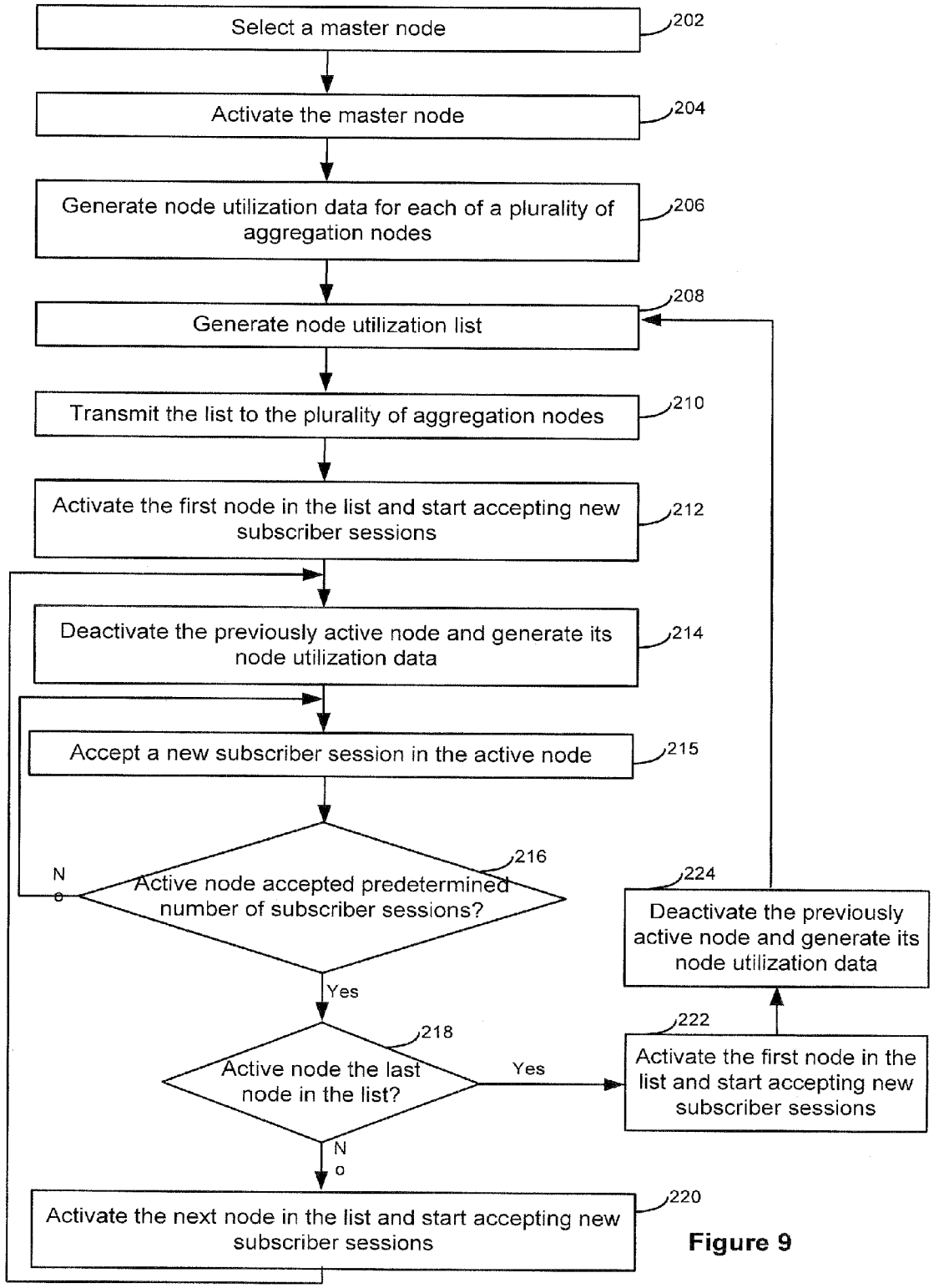
FIG. 9 illustrates an example flow chart of a load distribution method associated with the network of FIGS. 2-8.

FIG. 9 illustrates an example flow chart of a load distribution method associated with the network of FIGS. 2-8. Referring to FIG. 9, the method selects a master node from a plurality of aggregation nodes at 202. In an optional step (not shown), the method may also select a backup node, which may act as a backup to the master node. The master node becomes active at 204 and starts accepting new subscriber sessions from subscribers connected to subscriber network. Each of the plurality of aggregation nodes generates its node utilization data at 206 and transmits the node utilization data to the pool master.

The pool master generates a node utilization list at 208 responsive to the node utilization data received from the plurality of aggregation nodes and transmits the node utilization list to the plurality of the aggregation nodes at 210. After the plurality of aggregation nodes receive the node utilization list, the first aggregation node in the node utilization list becomes active and starts accepting new subscriber sessions at 212. Any previously active aggregation node becomes inactive (or deactivates), generates its current node utilization data and transmits its node utilization data to the pool master at 214. The active aggregation node accepts a new subscriber session from a subscriber connected to the subscriber network at 215.

The node utilization list may include a predetermined number of new subscriber sessions that an active aggregation node may accept before it reaches a certain threshold value. The active aggregation node checks at 216 if it has accepted the predetermined number of subscriber sessions mentioned in the node utilization list. If the active aggregation node has accepted less than the predetermined number of new subscriber sessions (i.e., No at 216), then the active aggregation node continues accepting new subscriber sessions at 215. Once the aggregation node has accepted the predetermined number of new subscriber sessions mentioned in the node utilization list (i.e., Yes at 216), the active aggregation node checks at 218 if it is the last aggregation node in the node utilization list. If the active aggregation node is not the last aggregation node in the node utilization list (i.e., 'No' at 218), the next aggregation node in the node utilization list becomes active and starts accepting new subscriber sessions at 220. The previously active aggregation node becomes inactive (or deactivates), generates and transmits its node utilization data to the pool master at 214 and the process continues until the last aggregation node in the node utilization list becomes active.

There may be a delay between activating an aggregation node at 220 and deactivating a previously active aggregation node at 214. During this period, two aggregation nodes may simultaneously be active and any one or both the active aggregation nodes may respond to a subscriber's request to initiate a new subscriber session. The subscriber may receive offers for new subscriber sessions from both the active aggregation nodes during this period and may accept the first offer received and discard the other. During a changeover of the active aggregation node, i.e., when a new aggregation node (incoming node) becomes active and a previously active aggregation node (outgoing node) becomes inactive, a small delay may be added to the response of the outgoing aggregation node. This will ensure that even if an outgoing aggregation node makes an offer for a new subscriber session to a new subscriber, the offer would be delayed and the subscriber would receive an offer from the incoming aggregation node before receiving the offer from the outgoing node. The subscriber would, thereby, initiate a subscriber session with the incoming aggregation node.

Referring back to 218, if the active aggregation node is the last aggregation node in the node utilization list (i.e., Yes at 218), the first aggregation node in the node utilization list becomes active at 222 and starts accepting new subscriber sessions. The previously active aggregation node, which is the last aggregation node in the node utilization list, becomes inactive, generates and transmits its node utilization data to the pool master at 224. The pool master generates a new node utilization list at 208 responsive to the node utilization data received from the plurality of aggregation nodes and the process continues.

We describe embodiments with reference to the drawings. Various other embodiments are also possible and practical. The embodiments should not be construed as being limited to the examples we set forth above.

The system we describe above can use dedicated processor systems, micro controllers, programmable logic devices, or microprocessors that perform some or all of the operations. Some of the operations described above may be implemented in software and other operations may be implemented in hardware or a combination of both software and hardware.

For the sake of convenience, we have described the operations as various interconnected functional blocks or distinct software modules. This is not necessary, however, and there may be cases where these functional blocks or modules are equivalently aggregated into a single logic device, program, or operation with unclear boundaries. In any event, the functional blocks and software modules or features of the flexible interface can be implemented by themselves, or in combination with other operations in either hardware or software.

We claim all modifications and variations coming within the spirit and scope of the following claims.

We claim:

1. A method comprising:
   generating node utilization data for each of a plurality of aggregation nodes;
   generating a node utilization list responsive to the node utilization data;
   activating a first aggregation node from the plurality of aggregation nodes responsive to the node utilization list;
   accepting a subscriber session in the first aggregation node after activating the first aggregation node;
   deactivating the first aggregation node after accepting a predetermined number of other subscriber sessions in the first aggregation node responsive to the node utilization list so that the first aggregation node will not accept new subscriber sessions;
   generating node utilization data of the first aggregation node after deactivating the first aggregation node;

activating a second aggregation node from the plurality of aggregation nodes responsive to the node utilization list;

deactivating the second aggregation node after accepting a predetermined number of other sessions in the second aggregation node responsive to the utilization list so that the second aggregation node will not accept new subscriber sessions;

generating node utilization data of the second aggregation node after deactivating the second aggregation node; and creating a new node utilization list when the second aggregation node is a last node listed in the node utilization list.

2. The method of claim 1 comprising activating the second aggregation node before deactivating the first aggregation node.

3. The method of claim 1 comprising generating the node utilization list where the first aggregation node is listed before the second aggregation node.

4. The method of claim 1 comprising delaying a response of the first aggregation node to a request for accepting the other subscriber sessions, after activating the second aggregation node and before deactivating the first aggregation node.

5. A system comprising:
a plurality of aggregation nodes, each aggregation node configured to generate a node utilization data; and
a pool master configured to generate a node utilization list responsive to the node utilization data received from each aggregation node and to activate the plurality of aggregation nodes responsive to the node utilization list so that the activated aggregation nodes accept new subscriber sessions;
where the pool master substantially balances a load across the plurality of aggregation nodes responsive to the node utilization list;
where an active aggregation node is configured, responsive to the node utilization list, to deactivate after the active aggregation node accepts a certain number of subscriber sessions so that the deactivated aggregation node no longer accepts additional subscriber sessions and maintains the currently accepted subscriber sessions; and
where the plurality of aggregation nodes are configured to update their corresponding node utilization data to the pool master responsive to deactivation;
where the pool master is configured to update the node utilization list responsive to receiving node utilization data from an aggregation node that is the last node in a current node utilization list.

6. The system of claim 5 where the plurality of aggregation nodes are connected in parallel and configured to accept a subscriber session responsive to the node utilization data.

7. The system of claim 5, where a first aggregation node from the plurality of aggregation nodes is configured to activate before a second aggregation node from the plurality of aggregation nodes is configured to activate; and
where the pool master is configured to recognize the first aggregation node as having more bandwidth than the second aggregation node while generating the node utilization list.

8. The system of claim 5, where another aggregation node is configured to activate responsive to the node utilization list, before the active aggregation node is configured to deactivate.

9. The system of claim 5, where the pool master is configured to generate the node utilization list as a weighted round robin list responsive to the node utilization data.

10. A network comprising:
a plurality of aggregation nodes each configured to generate corresponding node utilization data;
a pool master configured to balance a load of each of the plurality of aggregation nodes and generate a load utilization list responsive to the corresponding node utilization data, and the pool master further configured to balance the load of each of the plurality of aggregation nodes responsive to the load utilization list;
where first and second aggregation nodes are configured to activate and deactivate responsive to the node utilization list;
where a second aggregation node is configured to activate responsive to the node utilization list, before the first aggregation node is configured to deactivate;
where the first aggregation node is configured to update first aggregation node utilization data to the pool master after the first aggregation node deactivates;
where the second aggregation node is configured to update second aggregation node utilization data to the pool master after the second aggregation node deactivates; and
where the pool master is configured to update the node utilization list responsive to updated node utilization data from the second aggregation node when the second aggregation node is the last node in the node utilization list.

11. The network of claim 10 where each of the aggregation nodes is configured to transmit the corresponding node utilization data to the pool master.

* * * * *